United States Patent
Saba et al.

[11] Patent Number: 6,007,196
[45] Date of Patent: Dec. 28, 1999

[54] RETAINER FOR EYEGLASS FRAMES HAVING SIDESHIELDS

[75] Inventors: Adeeb G Saba, Midlothian; Jan P Griffin, Chesterfield, both of Va.; Aly G Khalifa, Raleigh, N.C.

[73] Assignee: Titmus Optical, Inc., Petersburg, Va.

[21] Appl. No.: 09/257,935

[22] Filed: Feb. 26, 1999

[51] Int. Cl.$^6$ .................................................. G02C 1/00
[52] U.S. Cl. ................................................ 351/44; 2/13
[58] Field of Search ........................... 351/44, 47, 121, 351/122, 111, 158, 57; 24/3.3; 2/449, 451, 448, 12, 13

[56] References Cited

U.S. PATENT DOCUMENTS

| | | |
|---|---|---|
| 2,247,499 | 7/1941 | Hutchison, Jr. . |
| 2,634,416 | 4/1953 | Fehrs ......................................... 351/44 |
| 3,721,490 | 3/1973 | Prince . |
| 4,096,901 | 6/1978 | Reichenbach . |
| 5,548,351 | 8/1996 | Hirschman et al. . |
| 5,697,743 | 12/1997 | Parker . |
| 5,697,929 | 12/1997 | Mellinger . |
| 5,713,705 | 2/1998 | Grunbichler . |
| 5,748,278 | 5/1998 | Simmons, Sr. . |
| 5,798,815 | 8/1998 | Hirschman et al. . |

*Primary Examiner*—Hung Xuan Dang
*Attorney, Agent, or Firm*—Millen, White, Zelano & Branigan

[57] ABSTRACT

A retainer locks an eyeglass sideshield to a temple of an eyeglass frame. The retainer comprises a clamp, an ann and a hook. A clamp is adapted to attach to the temple of the eyeglass frame. The arm has a first end and a second end. The first end is connected to the clamp and the second end is connected to the hook. The hook comprises a lip adapted to engage the sideshield and prevents the sideshield from being removed from the temple.

16 Claims, 1 Drawing Sheet

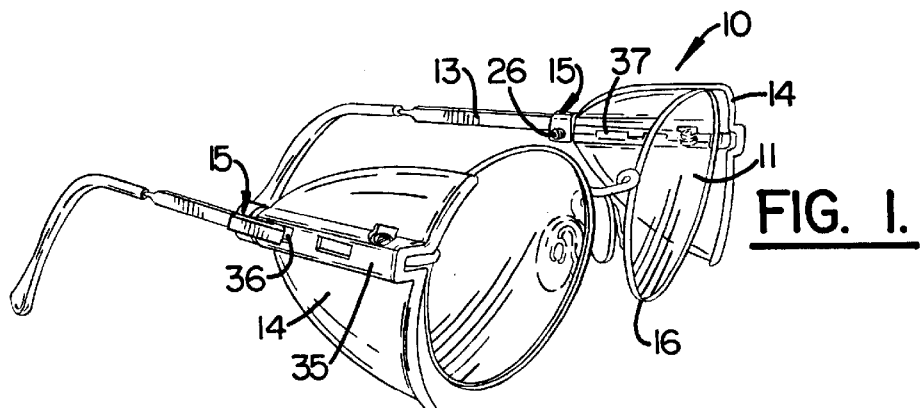
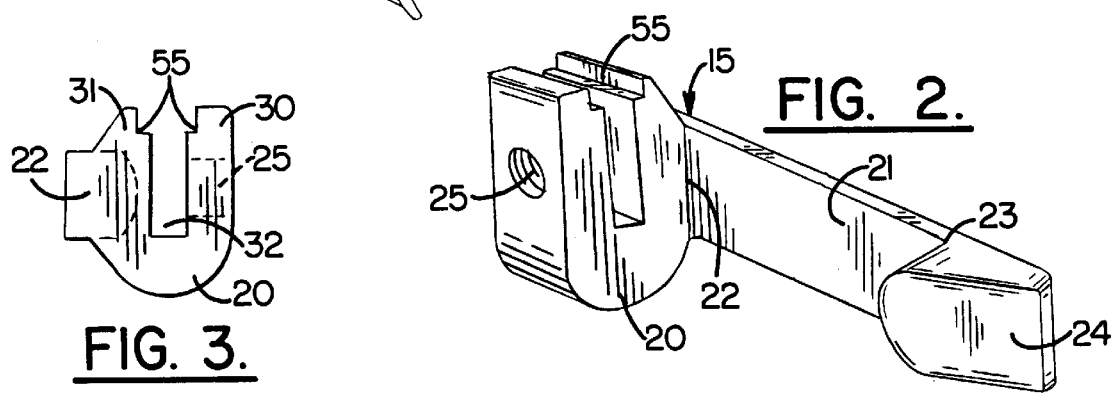
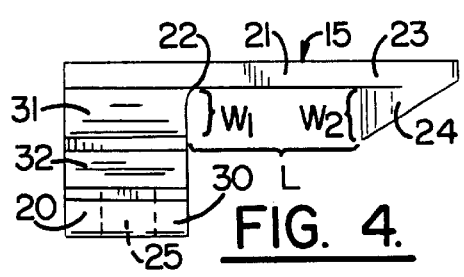
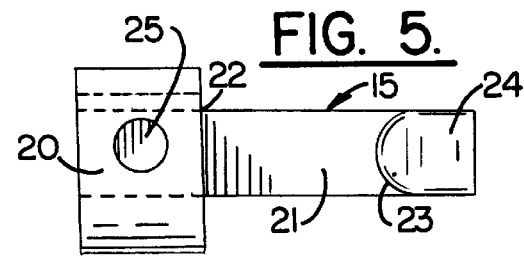
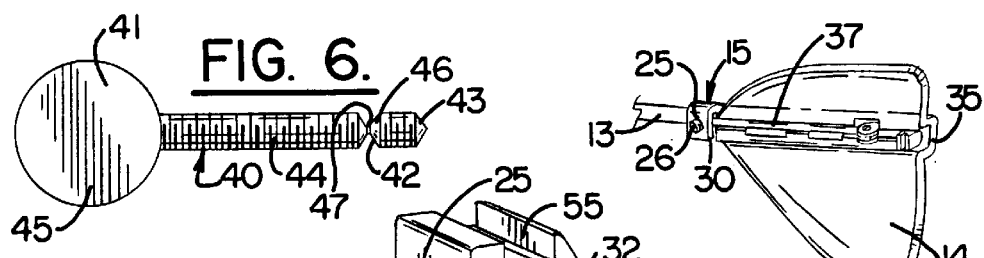
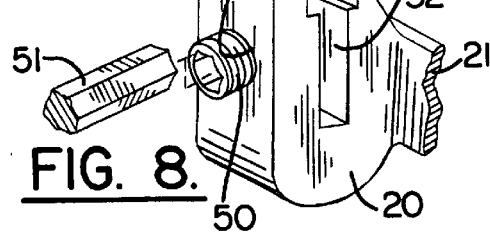

RETAINER FOR EYEGLASS FRAMES HAVING SIDESHIELDS

BACKGROUND OF THE INVENTION

The present invention relates to eyeglasses having sideshields and retainers fo those sideshields in place.

Conventional eyeglass frames may include sideshields which are removably mounted on the temple of the frames. This convenience, whereby the sideshields may be removed, enhances the versatility of the glasses. In other words, the glasses may be cosmetically or stylishly appealing to an individual's taste. In an environment that requires sideshields, the removable sideshields can be merely snapped in place or otherwise easily attached. The problem with this versatility is that individual users may forget to affix the sideshields to the glasses when necessary or they may lose the sideshields when they are not in use. When a sideshield serves a primarily safety purpose, the lack of a sideshield may result in a potentially dangerous situation where an eye could possibly be exposed to damage in a given work environment.

Consequently, there are situations where, for instance, an employer running a manufacturing facility prefers that sideshields be permanently affixed to an individual's eyeglasses. The primary methods of this attachment have been rivets, screws, lock nuts or adhesives. In at least some of the prior art systems, the use of screws have required that holes be drilled in the temples of the glasses. Other solutions include lock washers that press the sideshield into the temple and cause a permanent force fit between the two. All of these prior solutions have drawbacks.

SUMMARY OF THE INVENTION

The present invention overcomes prior problems and makes it possible to attach sideshields to the temples of a pair of glasses in such a manner that the sideshields cannot easily be removed.

The invention according to one embodiment includes a retainer for locking an eyeglass sideshield to a temple of an eyeglass frame. The retainer comprises a clamp, an arm, and a hook. The clamp is adapted to attach to the temple of the eyeglass frame. The arm has a first end and a second end, the first end connected to the clamp and the second end connected to the hook. The hook comprises a lip adapted to engage the sideshield and prevents the sideshield from being removed from the temple. Other embodiments include the retainer wherein the clamp further comprises a threaded bore and a screw. Additionally, the screw may be not removable after installation. In another embodiment, the arm of the retainer is rigidly attached to the clamp and to the hook such that the entire retainer is a rigid member.

In a further embodiment, the invention includes a kit for attaching a safety sideshield to a temple of a pair of glasses. The kit comprises a retainer and a sideshield. The retainer comprises a clamp, an arm and a hook as described earlier herein. The sideshield comprises an aperture for receiving the hook. In an alternative embodiment, the kit described above comprises a sideshield having an indentation for receiving the hook rather than the aperture described above.

BRIEF DESCRIPTION OF THE DRAWINGS

For the purpose of illustrating the invention, there is shown in the drawings an embodiment which is presently preferred, it being understood, however, that the invention is not limited to the precise arrangements and instrumentality shown.

FIG. 1 is a perspective view of a pair of eyeglasses having sideshields mounted thereto including a preferred embodiment of the retainer according to the present invention.

FIG. 2 is an enlarged perspective view of a preferred embodiment of the retainer according to the present invention.

FIG. 3 is a rear elevation view of a preferred embodiment of the retainer according to the present invention.

FIG. 4 is a top elevation view of a preferred embodiment of the retainer according to the present invention.

FIG. 5 is a side elevation view of a preferred embodiment of the retainer according to the present invention.

FIG. 6 is a side elevation view of a screw according to one embodiment of the present invention.

FIG. 7 is a perspective view of an eyeglass frame temple and sideshield wherein the sideshield is locked to the temple by a preferred embodiment of the retainer according to the present invention.

FIG. 8 is a perspective view of the clamp portion of a preferred embodiment of the retainer according to the present invention.

DETAILED DESCRIPTION OF THE INVENTION

Referring now to the drawings, there is shown in FIG. 1 a pair of eyeglasses 10 which have sideshields 14 coupled to the temples 13 of the eyeglass frames 16 in accordance with a preferred embodiment of the present invention. FIG. 1 also illustrates the lenses 11 that are mounted within the eyeglass frame 16.

Referring still to FIG. 1, a longitudinally extending channel 35 is formed in each sideshield 14. The channels 35 extend along a longitudinal axis and are adapted to closely receive a respective temple 13 of the eyeglass frame 16. The channel 35 portion of the sideshield 14 firther includes clip holes 36. In practice, the sideshields will snap in place where the temple 13 is received in the channel 35 and retained there to function, for instance, as a safety sideshield. Channel clips 37 hold the sideshield 14 in place on the temple 13. As noted earlier, in conventional practice, the sideshields 14 may be snapped into place about the temple 13 or removed at the convenience of the eyeglass wearer. In the case of FIG. 1, however, the sideshields 14 are held in place by the retainers 15.

The sideshields 14 are typically made up of a propionate or polycarbonate plastic material that is well known to those in the sideshield industry. This plastic material is flexible enough to allow the sideshield to be snapped in place but, in the case of safety sideshields, rigid and shatter proof enough to provide safety advantages to a wearer. The details of actually manufacturing sideshields will vary according to the type of plastic and, if applicable, the safety specifications. Typically, the thickness of a safety sideshield made from propionate material is in the range of 0.5 to 25 mm. This thickness provides for the flexibility and impact attributes preferred in a safety sideshield. Other types of sideshields, for instance for sun shade or sun block purposes, may also be used in connection with the present invention.

FIGS. 2 through 5 illustrate the specific features of the retainer 15. The retainer 15 is made up of a clamp 20, arm 21, and hook 24. The arm 21 has a first end 22 and a second end 23. The first end 22 is connected to the clamp 20, and the second end 23 is connected to the hook 24. The clamp 20 is a generally u-shaped piece adapted to fit around a temple such as temple 13 illustrated in FIG. 1. The clamp 20 includes an inside prong 30 and an outside prong 31. The space defined inside the u-shaped clamp 20 is groove 32. The inside prong 30 further includes a threaded bore 25 for receiving a screw (not shown). The arm 21 is connected to the side of the outside prong 31. The arm 21 is a thin flat rod that connects to one side of the hook 24. The hook 24 protrudes generally in the same direction and is mounted on the same side of the arm 21 as is the clamp 20. The width of the outside prong 31 of the clamp 20 is designated as $W_1$. $W_1$ is greater than the thickness of the sideshield 14 in the portion of the sideshield along the temple area. Likewise, the thickness of the hook 24 is designated as $W_2$. That width $W_2$ is approximately the same as the thickness of the sideshield 14. At the very least, the width $W_2$ is greater than the portion of $W_1$ that is greater than the thickness of the sideshield 14. With $W_1$ being greater than the width of a sideshield, the retainer 15 is able to be anchored to a temple 13 and the arm 21 will pass across the outside of a portion of the sideshield 14. The hook 24 then will protrude into the clip hole 36 or any other aperture or indentation in the sideshield. Similarly, the length of the arm 21 of a retainer 25 is predetermined based on the location of a clip hole 36 or other aperture or indentation in a sideshield.

In a preferred embodiment, where the temple on which the retainer is to be mounted is made of metal, the thickness $W_1$ equals 2.1 mm. The length of the arm 21, designated as L, is 7.1 mm—slightly longer than the distance the clip hole 36 is from the back of the sideshield. And the thickness of $W_2$ of the hook 24 is 2.1 mm. These measurements allow a retainer like retainer 15 to secure most TITMUS® brand sideshields to the temples of eyeglasses on which the sideshields are mounted. Obviously, other width and length specifications can be formulated to secure other types of sideshields to other types of temples. The only requirement of the sideshield is that it have an aperture or indentation into which a hook like hook 24 can extend. An aperture like clip hole 36 can be molded into, i.e., purposely designed into the sideshield. Alternatively, an indentation like a reduced thickness portion of a sideshield will provide a space for the hook like hook 24 to extend into. Preferably, the retainer 15 does not actually come into contact with the sideshield 14 until a lateral or "roll-off" force is applied to the sideshield, for instance when a wearer tries to remove the sideshield.

The retainer 15 is preferably rigid and made from material such as stainless steel or die cast zinc alloy. A rigid retainer 15 is very difficult to remove from a temple. Likewise, it makes removal of a sideshield difficult or impossible without damaging the sideshield or temple. Alternatively, however, the different portions of the retainer 15 including the clamp 20, arm 21 and hook 24 may be comprised of different materials to allow for other desired rigidity, flexibility, tamper-proof attributes, for instance. Therefore, a retainer may be used in connection with safety, sports, outdoorsman, or any other applications.

FIG. 6 shows an alternate embodiment of a screw 40, that serves the same function as screw 26 shown in FIG. 1. The screw 40 in FIG. 6 includes a torque head 41, a torque-limiting area 42, and a set screw 43. The torque head 41 includes a shaft 44 and a flat grip 45. The torque head 41 is attached to the set screw 43 by a torque-limiting area 42. The torque-limiting area 42 comprises a neck portion 46 which tapers down to reduced-radius failure point 47. The screw 40 is designed so that the torque head 41 shears at the failure point 47 at a predetermined torque range of about one-half to six inch-pounds, preferably one-half to two inch-pounds, in order to eliminate the need for a torque wrench or other cutter to remove the torque head 41 from the set screw 43.

The length of the set screw 43 is substantially equal to the thickness of the threaded bore 25. In this way, the screw 43 will protrude into and be tightened into a temple 13 that is resting in the groove 32 of the clamp 20. The torque-limiting area 42 then fails so that the torque head 41 can be disposed of and the screw 43 is permanently set in place.

FIG. 7 illustrates how the temple 13 is mounted within the channel 35 of the sideshield 14. Channel clips 37 secure the sideshield 14 onto the temple 13. The retainer 15 then locks the sideshield 14 in place. The screw 26 is threaded into the bore 25 so that it is flush with the inside prong 30 and may even be inset some into the inside prong so that the screw does not protrude.

FIG. 8 illustrates a clamp 20 and specifically a second alternative embodiment of screw 50 similar to the screw 26 illustrated in FIG. 1. In FIG. 8 the screw 50 is tightened by means of an wrench 51. This screw 50 is removable by a wearer of a pair of glasses. The u-shaped clamp disclosed in the drawings is just one type of clamp that could be used. Those of skill in the art will know of many other types of clamps that could be used to fix the retainer to the temple.

Different types of screws may be used so that different types of tools may be required to mount or remove the retainer. The illustrated embodiment of the screw 50 is tightened by use of an allen wrench. In order to make the installation relatively permanent, tamper-proof fasteners and tools may be employed. These alternative fastening means are well-known to those skilled in the art.

In the case where a retainer is permanently affixed to a temple, the only way to remove the retainer is to destroy its integrity. For the embodiment displayed in FIGS. 2–6, for instance, a special pair of pliers similar in principle to snap ring pliers can be used to force open the prongs of the retainer and bend it open so that it is no longer tightened into the temple. The ends of the snap ring pliers engage the small ridges 55 at the top of the inside and outside prongs 30 and 31 as illustrated in FIGS. 2–4. This way, the retainer can be removed and the sideshield removed or replaced.

The present invention may be embodied in other specific forms without departing from the spirit or essential attributes thereof and, accordingly, reference should be made to the appended claims rather than to the foregoing specification as indicating the scope of the invention.

That which is claimed is:

1. A retainer for locking an eyeglass sideshield to a temple of an eyeglass frame, the retainer comprising
    a clamp, an arm, and a hook,
    the clamp being adapted to attach to the temple of the eyeglass frame,
    the arm having a first end and a second end, the first end connected to the clamp and the second end connected to the hook, and
    the hook comprising a lip adapted to engage the sideshield and prevent it from being removed from the temple.

2. The retainer described in claim 1 wherein the clamp further comprises a threaded bore and a screw whereby the clamp is attachable to the temple by tightening the screw into the threaded bore.

3. The retainer described in claim 2 wherein the screw is not removable after it has been tightened into the threaded bore.

4. The retainer described in claim 1 wherein the arm is rigidly attached to the clamp and to the hook.

5. The retainer described in claim 4 wherein the retainer is made from stainless steel.

6. The retainer described in claim 4 wherein the retainer is made from die cast zinc alloy.

7. A kit for attaching a safety sideshield to a temple of a pair of eyeglasses, the kit comprising a retainer and a sideshield, the retainer comprising a clamp, an arm, and a hook, the clamp being adapted to attach to the temple of the eyeglass frame, the arm having a first end and a second end, the first end connected to the clamp and the second end connected to the hook, the hook comprising a lip adapted to engage the sideshield and prevent it from being removed from the temple, and the sideshield comprising an aperture for receiving the hook.

8. The kit described in claim 7 wherein the sideshield comprises a channel adapted to receive the temple of the eyeglass.

9. The kit described in claim 8 wherein the channel comprises the aperture for receiving the hook.

10. The kit described in claim 8 wherein the channel comprises a clip hole, the clip hole being the aperture for receiving the hook.

11. The kit described in claim 7 wherein the clamp further comprises a threaded bore, the kit further comprising a screw whereby the clamp is attachable to the temple by tightening the screw into the threaded bore.

12. The kit described in claim 11 wherein the screw comprises a torque-limiting area and a torque head which is sheared off from the screw upon tightening the screw into the threaded bore.

13. The kit described in claim 12 wherein the threaded bore has a thickness, and the screw comprises a set screw adapted to be received by the threaded bore and a torque-limiting area wherein the set screw has a length substantially equal to the thickness of the threaded bore, whereby the set screw tightened into the threaded bore is not removable after it is tightened and the screw fails at the torque-limiting area.

14. A kit for attaching a safety sideshield to a temple of a pair of eyeglasses, the kit comprising a retainer and a sideshield, the retainer comprising a clamp, an arm, and a hook, the clamp being adapted to attach to the temple of the eyeglass frame, the arm having a first end and a second end, the first end connected to the clamp and the second end connected to the hook, the hook comprising a lip adapted to engage the sideshield and prevent it from being removed from the temple, and the sideshield comprising an indentation for receiving the hook.

15. The kit described in claim 14 wherein the sideshield comprises a channel adapted to receive the temple of the eyeglass.

16. The kit described in claim 13 wherein the channel comprises the indentation for receiving the hook.

* * * * *